United States Patent
Zywiak

(10) Patent No.: US 9,784,508 B2
(45) Date of Patent: Oct. 10, 2017

(54) METHOD OF MONITORING A HEAT EXCHANGER ARRANGEMENT AND RAM AIR FAN IN AN AIRCRAFT TO PREVENT STALL CONDITIONS

(71) Applicant: Hamilton Sundstrand Corporation, Windsor Locks, CT (US)

(72) Inventor: Thomas M. Zywiak, Suffield, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 668 days.

(21) Appl. No.: 13/863,718

(22) Filed: Apr. 16, 2013

(65) Prior Publication Data

US 2014/0305610 A1    Oct. 16, 2014

(51) Int. Cl.
| | | |
|---|---|---|
| *B60H 1/00* | (2006.01) | |
| *F28F 27/00* | (2006.01) | |
| *B64D 13/08* | (2006.01) | |
| *B64D 13/06* | (2006.01) | |

(52) U.S. Cl.
CPC .............. *F28F 27/00* (2013.01); *B64D 13/08* (2013.01); *B64D 2013/0644* (2013.01); *Y02T 50/56* (2013.01)

(58) Field of Classification Search
CPC . F28F 27/00; B64D 13/08; B64D 2013/0644; Y02T 50/56
See application file for complete search history.

(56) References Cited

U.S. PATENT DOCUMENTS

| | | | | |
|---|---|---|---|---|
| 3,326,109 | A | * | 6/1967 | Markham .............. B64D 13/06 454/236 |
| 7,261,762 | B2 | * | 8/2007 | Kang et al. ......................... 95/1 |
| 8,321,118 | B2 | * | 11/2012 | Moeckly et al. ............... 701/99 |

(Continued)

FOREIGN PATENT DOCUMENTS

| | | |
|---|---|---|
| JP | H05332590 A | 12/1993 |
| JP | H10160228 A | 6/1998 |
| JP | 2010223494 A | 10/2010 |

OTHER PUBLICATIONS

Martino http://web.archive.org/web/20060222124342/http://www.powerqualityanddrives.com/motor_protection/ Motor Protection: Preventing the Burn-out Copyright © 2002 Francis J. Martino Power Quality and Drives LLC http://www.powerqualityanddrives.com/.*

(Continued)

*Primary Examiner* — Len Tran
*Assistant Examiner* — Gordon Jones
(74) *Attorney, Agent, or Firm* — Cantor Colburn LLP

(57) ABSTRACT

A method of monitoring a heat exchanger arrangement is provided. The method includes detecting a rotational speed of a ram air fan configured to draw air through the heat exchanger arrangement. The method also includes detecting a power input from a motor to the ram air fan to maintain a commanded rotational speed of the ram air fan. The method further includes comparing the power input detected to a predetermined power limit for the commanded rotational speed. The method yet further includes decreasing the rotational speed of the ram air fan with a controller if the power input detected exceeds the predetermined power limit.

13 Claims, 2 Drawing Sheets

(56) References Cited

U.S. PATENT DOCUMENTS

| | | | | |
|---|---|---|---|---|
| 2005/0068001 A1* | 3/2005 | Skaug | .................... | F04C 28/08 |
| | | | | 318/807 |
| 2006/0064959 A1* | 3/2006 | Simoni | .................... | G01D 7/04 |
| | | | | 60/39.281 |
| 2008/0219866 A1* | 9/2008 | Kwong | .................... | B60K 6/46 |
| | | | | 417/410.1 |
| 2010/0242506 A1* | 9/2010 | Daddis, Jr. | ............ | F25D 21/006 |
| | | | | 62/89 |
| 2011/0295524 A1* | 12/2011 | Tada | ................. | H05K 7/20181 |
| | | | | 702/45 |
| 2011/0316706 A1* | 12/2011 | Cash | ................. | B01D 46/0086 |
| | | | | 340/584 |

OTHER PUBLICATIONS

Electromechanical Dynamics Part I: Discrete Systems Herbert H. Woodson James R. Melcher John Wiley & Sons, Inc., New York—London . Sydney pp. 132-164.*
JP 2010-223494 machine translation.*
EP Search Report regarding related EP Application No. 14164045.8-1754; dated Aug. 25, 2014; 9 pgs.

* cited by examiner

METHOD OF MONITORING A HEAT EXCHANGER ARRANGEMENT AND RAM AIR FAN IN AN AIRCRAFT TO PREVENT STALL CONDITIONS

BACKGROUND OF THE INVENTION

The present invention relates to heat exchanger arrangements, and more particularly to a method of monitoring a heat exchanger arrangement for excessive pressure drops that may lead to a stall condition.

Motor assemblies utilizing ram air flow are employed in a variety of applications, with one such application being an aircraft. The ram air flow in an aircraft may serve various purposes, such as in cooling systems for the aircraft. For example, the ram air flow may be utilized to remove heat from various aircraft systems and/or be used to condition aircraft cabin air through a heat exchanger arrangement. When the aircraft is in flight, the movement of the aircraft creates a sufficient source of ram air flow which can be used for the purposes described above. When the aircraft is on the ground or is operating at low speeds, however, a ram air fan is typically utilized to supply air flow to the cooling systems. Over time, contamination from ambient air will increase the pressure drop of the heat exchanger arrangement, thereby reducing flow through the ram air fan and heat exchangers. Significant heat exchanger contamination may reduce the airflow to the extent that the ram air fan operates in an unstable operating mode, such as a stall condition, which may cause excessive blade stress resulting in a failure of the ram air fan.

BRIEF DESCRIPTION OF THE INVENTION

According to one embodiment, a method of monitoring a heat exchanger arrangement is provided. The method includes detecting a rotational speed of a ram air fan configured to draw air through the heat exchanger arrangement. The method also includes detecting a power input to a motor driving the ram air fan to maintain a commanded rotational speed of the ram air fan. The method further includes comparing the power input detected to a predetermined power limit for the commanded rotational speed. The method yet further includes decreasing the rotational speed of the ram air fan with a controller if the power input detected exceeds the predetermined power limit.

According to another embodiment, a heat exchanger arrangement monitoring system includes a ram air fan configured to draw air through a heat exchanger arrangement. Also included is a motor for powering the ram air fan. Further included is a controller in operative communication with the motor and configured to monitor a rotational speed of the ram air fan and a power required to drive the ram air fan, wherein the controller compares the power to a predetermined power limit.

According to yet another embodiment, an aircraft heat exchanger arrangement monitoring system includes an air conditioning system having a heat exchanger arrangement for conditioning a main flow. Also included is a ram air fan configured to draw the main flow during relatively low flow conditions of the main flow. Further included is a motor for powering the ram air fan. Yet further included is a controller in operative communication with the motor and configured to decrease a rotational speed of the ram air fan and a power required to drive the ram air fan upon detection of the power required exceeding a predetermined power limit at a commanded rotational speed of the ram air fan.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION OF THE INVENTION

Figure 1:
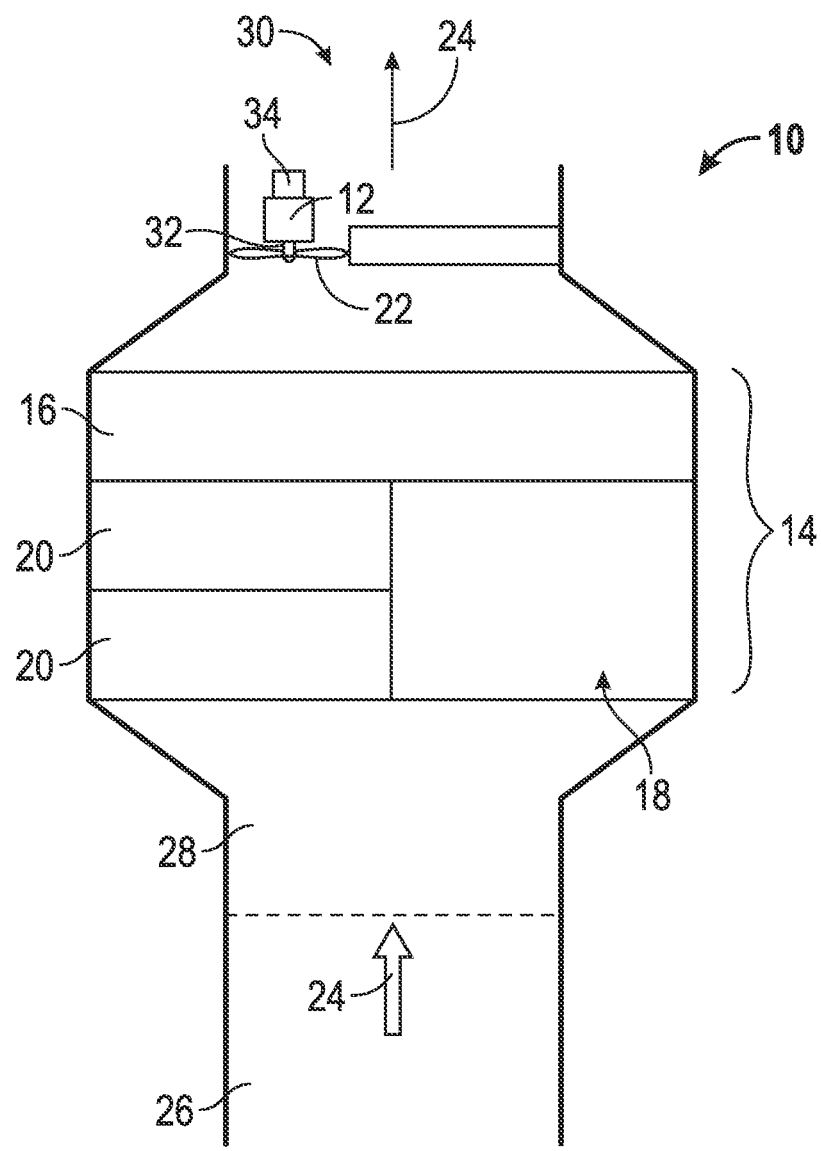
FIG. 1 is a schematic illustration of a heat exchanger arrangement monitoring system.

Referring to FIG. 1, a heat exchanger arrangement monitoring system 10 is schematically illustrated. The heat exchanger arrangement monitoring system 10 may be used in conjunction with an assembly or system of a vehicle, such as an aircraft, however, it is contemplated that other vehicles may benefit from the embodiments described herein. The heat exchanger arrangement monitoring system 10 includes a motor 12 and a heat exchanger arrangement 14 comprising at least one heat exchanger, such as a primary heat exchanger 16 and a secondary heat exchanger 18. In one embodiment, the heat exchanger arrangement 14 is part of an air conditioning system and works in conjunction with one or more air conditioning packs 20.

The motor 12 may be employed to drive a variety of contemplated loads and in the exemplary embodiment, the load is a ram air fan 22. The heat exchanger arrangement 14 is configured to ingest a fluid, such as a main flow 24 of air. The main flow 24 may be sourced from ambient air through a conduit 26 and is drawn into the heat exchanger arrangement 14 through a heat exchanger inlet 28 via a pressure drop across the heat exchanger arrangement 14. Subsequently, the main flow 24 is expelled via a heat exchanger outlet 30. In an aircraft embodiment, as noted above, there are times of operation when drawing of the main flow 24 is required by the ram air fan 22 during conditions when the natural airflow into the heat exchanger arrangement 14 is not sufficient to meet the requirements of the aircraft. Such an instance occurs while the aircraft is not in flight.

The ram air fan 22 is operably connected to the motor 12 via at least one shaft 32. The motor 12 is controlled by a controller 34 disposed relatively adjacent to the motor 12, but remote locations of the controller 34 are contemplated. Regardless of the precise positioning of the controller 34, the controller 34 is in operative communication with the motor 12. The operative communication between the motor 12 and the controller 34 allows the controller 34 to monitor a motor power required to drive the ram air fan 22 at a commanded rotational speed. The controller 34 is programmed with a specified power level that the motor 12 should exert under normal operating conditions at each commanded rotational speed of the ram air fan 22. Specifically, the controller 34 is programmed with at least one, but typically a plurality of normal power levels that correspond to a plurality of rotational speeds of the ram air fan 22 at given ambient conditions, such as temperature and pressure.

The heat exchanger arrangement monitoring system 10 is configured to indirectly monitor the pressure drop of the main flow 24 across the heat exchanger arrangement 14. One cause of increased pressure drop across the heat exchanger arrangement 14 relates to contamination from ambient air. Specifically, particles such as dirt and the like adhere to components of the heat exchanger arrangement 14 and produce excessive pressure drop therein. Contamination leads to an increase in motor power required to maintain a given commanded rotational speed of the ram air fan 22.

In operation, the increase in required power is detected by the controller 34 and compared to a predetermined power limit for a particular commanded rotational speed of the ram air fan 22. In one embodiment, the predetermined power limit corresponds to an increase of required power of about 10%. In other words, the predetermined power limit is about 110% of the normal power level at a given commanded rotational speed of the ram air fan 22. Irrespective of the precise predetermined power limit, the controller 34 is configured to perform one or more corrective actions to prevent operation of the ram air fan 22 in an unstable operating mode, such as a stall condition, which may lead to operation failure of the ram air fan 22. The controller 34 reduces the rotational speed of the ram air fan 22 by decreasing the power transferred from the motor 12. Additionally, a maintenance message may be initiated and delivered to alert system operators that cleaning of the heat exchanger arrangement 14 is required to remove contaminants from the heat exchanger arrangement 14 that likely caused the corrective action.

Figure 2:
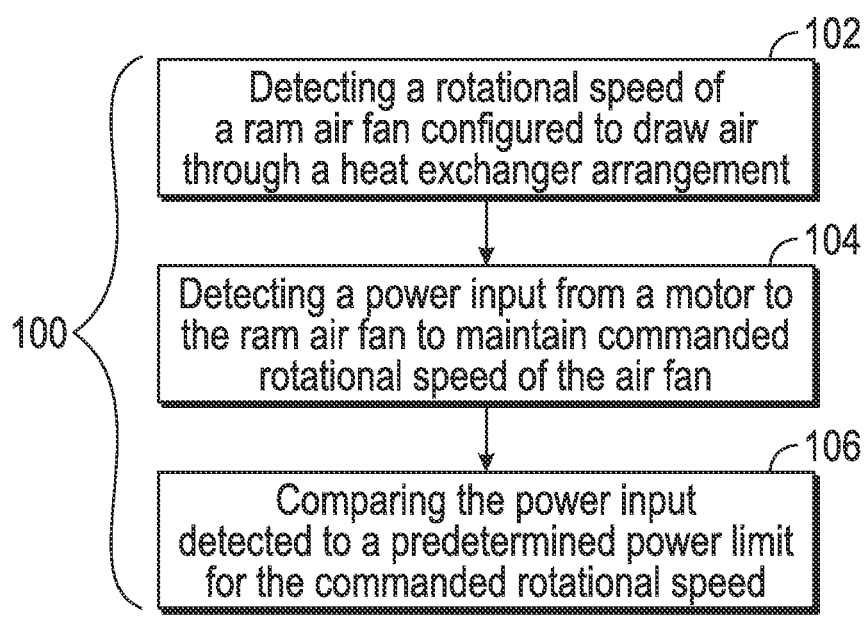
FIG. 2 is a flow diagram illustrating a method of monitoring a heat exchanger arrangement.

A method of monitoring a heat exchanger arrangement 100 is also provided, as illustrated in FIG. 2 and with reference to FIG. 1. The heat exchanger arrangement monitoring system 10 has been previously described and specific structural components need not be described in further detail. The method of monitoring a heat exchanger arrangement 100 includes detecting 102 a rotational speed of the ram air fan 22 that is configured to draw the main flow 24 through the heat exchanger arrangement 14. A power input is detected 104 from the motor 12 that is required to maintain a commanded rotational speed of the ram air fan 22. The method 100 also includes comparing 106 the power input detected 104 to a predetermined power limit for the commanded rotational speed.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of monitoring a heat exchanger arrangement comprising:
    detecting a rotational speed of a ram air fan configured to draw air through the heat exchanger arrangement;
    detecting a power input to a motor driving the ram air fan to maintain a commanded rotational speed of the ram air fan; and
    comparing the power input detected to a predetermined power limit for the commanded rotational speed with a controller programmed with a plurality of predetermined power limits corresponding to a plurality of rotational speeds of the ram air fan, each of the plurality of rotational speeds having a plurality of predetermined power limits at a plurality of ambient conditions, wherein the plurality of ambient conditions comprises different combinations of pressure and temperature, the controller programmed to account for different predetermined power limits at various rotational speeds at the plurality of ambient conditions.

2. The method of claim 1, further comprising decreasing the rotational speed of the ram air fan with the controller if the power input detected exceeds the predetermined power limit.

3. The method of claim 1, wherein the predetermined power limit comprises about 110% of a normal power input.

4. The method of claim 1, further comprising generating a maintenance message if the power input detected exceeds the predetermined power limit.

5. The method of claim 4, further comprising cleaning the heat exchanger arrangement of contaminants upon generation of the maintenance message.

6. The method of claim 1, wherein the method is performed on an aircraft heat exchanger arrangement disposed on an aircraft.

7. The method of claim 6, further comprising performing the method when the aircraft is not in flight.

8. A heat exchanger arrangement monitoring system comprising:
    a ram air fan configured to draw air through a heat exchanger arrangement;
    a motor for powering the ram air fan; and
    a controller in operative communication with the motor and configured to monitor a rotational speed of the ram air fan and a power required to drive the ram air fan, wherein the controller compares the power to a predetermined power limit, the controller programmed with a plurality of predetermined power limits corresponding to a plurality of rotational speeds of the ram air fan, each of the plurality of rotational speeds having a plurality of predetermined power limits at a plurality of ambient conditions, the plurality of ambient conditions comprising different combinations of pressure and temperature, the controller programmed to account for different predetermined power limits at various rotational speeds at the plurality of ambient conditions.

9. The heat exchanger arrangement monitoring system of claim 8, wherein the predetermined power limit comprises about 110% of a normal power input.

10. The heat exchanger arrangement monitoring system of claim 8, wherein the heat exchanger arrangement monitoring system is located on an aircraft.

11. The heat exchanger arrangement monitoring system of claim 8, wherein the controller is configured to control the power exerted by the motor to drive the ram air fan.

12. The heat exchanger arrangement monitoring system of claim 11, wherein the controller is configured to decrease the rotational speed of the ram air fan upon the power exceeding the predetermined power limit.

13. An aircraft heat exchanger arrangement monitoring system disposed on an aircraft comprising:
    an air conditioning system having a heat exchanger arrangement for conditioning a main flow;
    a ram air fan configured to draw the main flow when the aircraft is not in flight;
    a motor for powering the ram air fan; and
    a controller in operative communication with the motor and configured to decrease a rotational speed of the ram air fan and a power required to drive the ram air fan upon detection of the power required exceeding a predetermined power limit at a commanded rotational speed of the ram air fan, the controller programmed with a plurality of predetermined power limits corresponding to a plurality of rotational speeds of the ram air fan, each of the plurality of rotational speeds having a plurality of predetermined power limits at a plurality of ambient conditions, the plurality of ambient conditions comprising different combinations of pressure and temperature, the controller programmed to account for different predetermined power limits at various rotational speeds at the plurality of ambient conditions.

* * * * *